(12) United States Patent
Li et al.

(10) Patent No.: US 11,971,640 B2
(45) Date of Patent: Apr. 30, 2024

(54) DISPLAY SUBSTRATE AND DISPLAY DEVICE

(71) Applicants: Beijing BOE Display Technology Co., Ltd., Beijing (CN); BOE TECHNOLOGY GROUP CO., LTD., Beijing (CN)

(72) Inventors: Feng Li, Beijing (CN); Yu Ma, Beijing (CN); Qi Sang, Beijing (CN); Jiantao Liu, Beijing (CN); Li Tian, Beijing (CN); Jing Wang, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 156 days.

(21) Appl. No.: 17/631,334

(22) PCT Filed: Mar. 12, 2021

(86) PCT No.: PCT/CN2021/080394
§ 371 (c)(1),
(2) Date: Jan. 28, 2022

(87) PCT Pub. No.: WO2021/218439
PCT Pub. Date: Nov. 4, 2021

(65) Prior Publication Data
US 2022/0283457 A1 Sep. 8, 2022

(30) Foreign Application Priority Data
Apr. 29, 2020 (CN) .......................... 202010357107.7

(51) Int. Cl.
*G02F 1/1368* (2006.01)
*G02F 1/1362* (2006.01)

(52) U.S. Cl.
CPC ...... *G02F 1/1368* (2013.01); *G02F 1/136254* (2021.01); *G02F 1/136286* (2013.01)

(58) Field of Classification Search
CPC .......................... G02F 1/1368; G02F 1/136254
See application file for complete search history.

(56) References Cited

U.S. PATENT DOCUMENTS 9,581,841 B2  2/2017  Yanagisawa
2014/0176844 A1  6/2014  Yanagisawa

FOREIGN PATENT DOCUMENTS

CN  101221330 A  7/2008
CN  101969060 A  2/2011
(Continued)

OTHER PUBLICATIONS

CN 106252418 A translation (Year: 2016).*
(Continued)

*Primary Examiner* — James A Dudek
(74) *Attorney, Agent, or Firm* — HOUTTEMAN LAW LLC (57) ABSTRACT

The present disclosure provides a display substrate and a display device, and belongs to the field of display technology. The display substrate includes: a base substrate having a peripheral region, and thin film transistors disposed in the peripheral region of the base substrate. A gate electrode of the thin film transistor includes a plurality of sub-electrodes arranged at intervals.

11 Claims, 4 Drawing Sheets

(56) References Cited

FOREIGN PATENT DOCUMENTS

| | | |
|---|---|---|
| CN | 106252418 A | 12/2016 |
| CN | 207183274 U | 4/2018 |
| CN | 111505854 A | 8/2020 |
| JP | 2011149979 A | 8/2011 |

OTHER PUBLICATIONS

CN 207183274 U translation (Year: 2018).*
China Patent Office, CN202010357107.7 First Office Action dated Jun. 3, 2021.
China Patent Office, CN202010357107.7 Second Office Action dated Jan. 25, 2022.
China Patent Office, CN202010357107.7 Third Office Action dated May 12, 2022.

* cited by examiner

DISPLAY SUBSTRATE AND DISPLAY DEVICE

CROSS REFERENCE TO RELATED APPLICATION

This application is a National Phase Application filed under 35 U.S.C. 371 as a national stage of PCT/CN2021/080394, filed on Mar. 12, 2021, an application claiming the priority of the Chinese patent application No. 202010357107.7, filed on Apr. 29, 2020, the contents of which are incorporated herein by reference in their entirety.

TECHNICAL FIELD

The present disclosure belongs to the field of display technology, and particularly relates to a display substrate and a display device

BACKGROUND

At present, as consumers have higher requirements on the appearance and portability of electronic products, especially mobile phones and tablet computers, various display products are developed towards narrow bezels, which will inevitably bring new requirements to processes and designs of the products. Therefore, it becomes urgent to provide a design suitable for narrow-bezel products

SUMMARY

For solving at least one of the technical problems in the prior art, the present disclosure provides a display substrate and a display device.

In a first aspect, an embodiment of the present disclosure provides a display substrate, including: a base substrate having a peripheral region; and a thin film transistor disposed in the peripheral region of the base substrate; and a gate electrode of the thin film transistor includes a plurality of sub-electrodes arranged at intervals.

The peripheral region includes a test area; the display substrate further includes at least one test unit disposed in the test area of the base substrate; each of the at least one test unit includes at least one switching transistor disposed on the base substrate; and at least one switching transistor is the thin film transistor.

The base substrate further has a display region; a plurality of pixel units are arranged in an array in the display region, and each of the plurality of pixel units includes a plurality of sub-pixels; the at least one test unit is coupled to a column of the pixel units; each switching transistor of each test unit is coupled to a column of the sub-pixels; and gate electrodes of all the switching transistor in each test unit are an integral structure.

The display substrate further includes a plurality of data lines disposed on the base substrate, with the sub-pixels in the same column coupled to the same data line; and a source electrode of the switching transistor is coupled to the sub-pixels through the data line.

The display substrate further includes switch signal lines coupled to the test units, and different test units are connected to different switch signal lines.

The switch signal line has a first connection end; an extending direction of the first connection end of the switch signal line is the same as that of the sub-electrodes, and the first connection end of each of the switch signal lines is coupled to each sub-electrode of the corresponding test unit.

The first connection end has a comb-shaped structure, each tooth of the first connection end is coupled to a corresponding one of the sub-electrodes, and different teeth of the first connection end are coupled to different ones of sub-electrodes; and each tooth of the first connection end and the sub-electrode coupled thereto are an integral structure.

The switch signal line has a first connection end; an extending direction of the first connection end intersects with an extending direction of the sub-electrodes, and the first connection end of each of the switch signal lines is coupled to each sub-electrode of the corresponding test unit; and the switch signal line and the sub-electrodes coupled thereto are an integral structure.

Intervals between the sub-electrodes of the gate electrode are equal to one another; and/or a width of each the sub-electrodes of the gate electrode is equal.

A ratio of an interval between two adjacent sub-electrodes to a width of the sub-electrode is greater than 1:5.

In a second aspect, an embodiment of the present disclosure provides a display panel, including the display substrate described above, and a counter substrate disposed opposite to the display substrate.

DETAIL DESCRIPTION OF EMBODIMENTS

In order to enable those of ordinary skill in the art to better understand the technical solutions of the present disclosure, the present disclosure is further described in detail below with reference to the drawings and specific embodiments.

Unless otherwise defined, technical terms or scientific terms used herein should have general meanings that are understood by those of ordinary skills in the technical field of the present disclosure. The words "first", "second" and the like used herein do not denote any order, quantity or importance, but are just used to distinguish between different elements. Similarly, the words "one", "a", "the" and the like do not denote a limitation to quantity, and indicate the existence of "at least one" instead. The words "include", "comprise" and the like indicate that an element or object before the words covers the elements or objects or the equivalents thereof listed after the words, rather than excluding other elements or objects. The words "connect", "couple" and the like are not restricted to physical or mechanical connection, but may also indicate electrical connection, whether direct or indirect. The words "on", "under", "left", "right" and the like are only used to indicate relative positional relationships. When an absolute position of an object described is changed, the relative positional relationships may also be changed accordingly.

Figure 1:
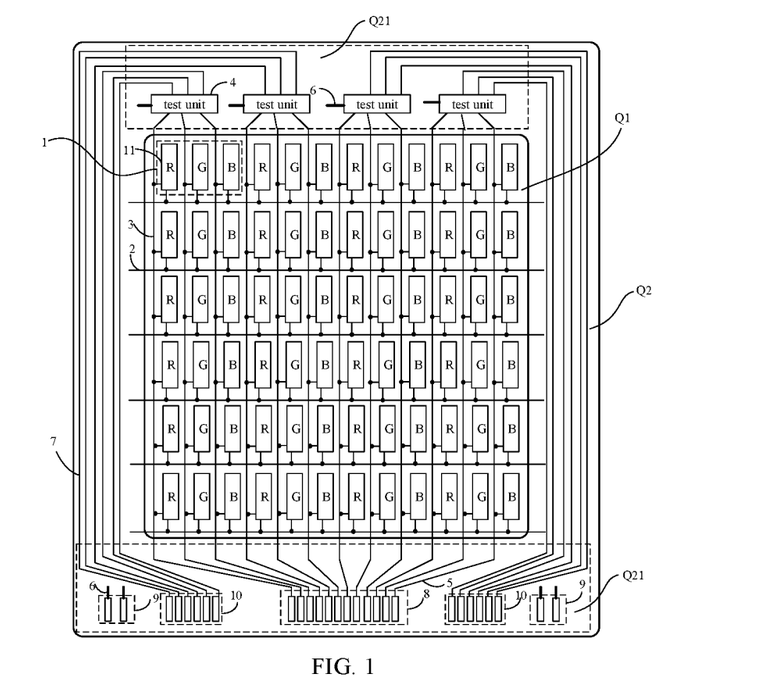
FIG. 1 is a schematic structural diagram of an exemplary display substrate.

FIG. 1 is a schematic structural diagram of an exemplary display substrate, which is used in a liquid crystal panel and may be an array substrate or a Color On Array (COA) substrate; and the following description is given by taking the array substrate as an example of the display substrate. The array substrate includes a base substrate provided with a middle region Q1 and a peripheral region Q2 surrounding the middle region Q1; the peripheral region Q2 includes a fan-out area Q21 and a test area Q22 which are located at an upper side and a lower side of the middle region Q1, with the upper side and the lower side opposite to each other; the array substrate further includes a plurality of gate lines 2 and a plurality of data lines 3 which are arranged on the base substrate; the gate lines 2 and the data lines 3 intersect to define a plurality of sub-pixels 11 in a display region; every three adjacent sub-pixels 11 along a row direction form one pixel unit 1, and the three adjacent sub-pixels 11 correspond to a red color resist, a green color resist and a blue color resist in a color filter layer of the liquid crystal panel, respectively; and for convenience of description, the three sub-pixels 11 in each pixel unit 1 are expressed by a red sub-pixel R, a green sub-pixel G and a blue sub-pixel B. The sub-pixels 11 in a same row are applied with scan signals by the same gate line 2, and the sub-pixels 11 in a same column are applied with data voltage signals by the same data line 3.

A plurality of fan-out wires 5 and signal pads 8 arranged in one-to-one correspondence with the fan-out wires 5 are provided in the fan-out area Q21; one end of the fan-out wire 5 is coupled to the data line 3, and the other end of the fan-out wire 5 is coupled to the signal pad 8; and a flexible circuit board (not shown) is bonded to the signal pads 8, and supplies the data voltage signals to the data lines 3 through a driver Integrated Circuit (IC) provided on the board.

Figure 2:
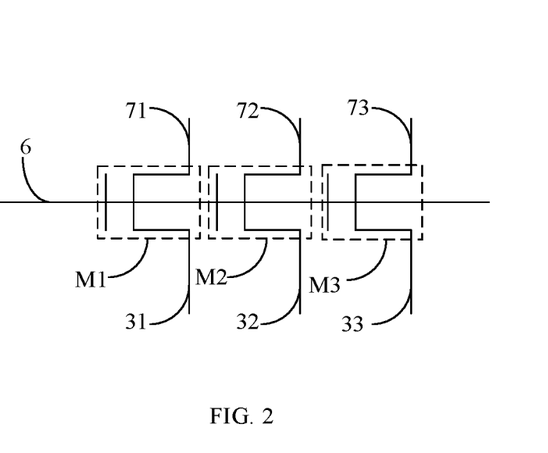
FIG. 2 is a circuit diagram of exemplary test units.
Figure 3:
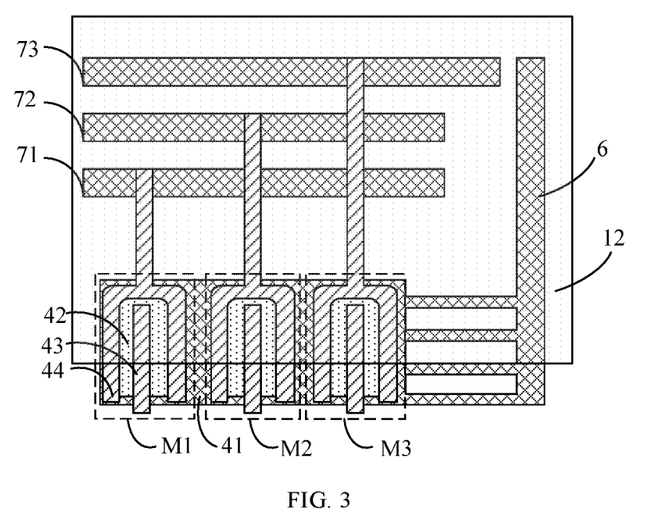
FIG. 3 is a layout diagram of a test area of a display substrate (one test unit is shown)

The test area Q22 is provided with test units 4, each test unit 4 corresponds to one column of pixel units 1. As shown in FIG. 2, each test unit 4 includes three switching transistors, which are denoted by M1, M2 and M3 respectively; and the switching transistors are arranged in one-to-one correspondence with the data lines. A source electrode 43 of each switching transistor is coupled to the corresponding data line (the source electrode of M1 is coupled to the data line 31, the source electrode of M2 is coupled to the data line 32, and the source electrode of M3 is coupled to the data line 33), a drain electrode 44 of each switching transistor is coupled to a corresponding test signal line (the drain electrode of M1 is coupled to a test signal line 71, the drain electrode of M2 is coupled to a test signal line 72, and the drain electrode of M3 is coupled to a test signal line 73), and a gate electrode 41 of each switching transistor is coupled to a corresponding switch signal line 6. When an operating level is written to the switch signal line 6, the switching transistor is turned on, and the test signal line 7 writes a test signal to the corresponding data line 3 through the switching transistor so as to test the sub-pixel 11 coupled to the data line 3. In order to avoid an influence of the test signal lines 7 and the switch signal lines 6 on an aperture ratio of the pixel of the display substrate, the test signal lines 7 and the switch signal lines 6 are disposed in the peripheral region Q2. Test pads 10 and control pads 9 are further provided in the fan-out area Q21. One end of the switch signal line 6 is coupled to the control pad 9 (only a connection end of the switch signal line 6 is shown in FIG. 1, but it should be understood that the switch signal line is coupled to the control pad 9 by passing through the peripheral region), and the other end of the switch signal line 6 is coupled to the gate electrode 41 of the corresponding switching transistor; one end of the test signal line 7 is coupled to the test pad 10, and the other end of the test signal line 7 is coupled to the drain electrode 44 of the corresponding switching transistor; and the flexible circuit board is bonded and coupled to the test pads 10 and the control pads 9 to provide switch signals for the switch signal lines 6 and provide the test signals for the test signal lines 7.

Since the drain electrodes 44 of the switching transistors in each test unit 4 are coupled to different test signal lines, the gate electrodes 41 of the switching transistors in each test unit 4 may be coupled to the same switch signal line 6 in order to reduce the wires in the peripheral region Q2, which allows the gate electrodes 41 of the switching transistors in each test unit 4 to be formed into an integral structure. When the array substrate is applied to a liquid crystal panel, the array substrate and a color film substrate need to be assembled together, and the peripheral region Q2 of the array substrate and the peripheral region of the color film substrate need to be sealed with a sealant 12. The applicant finds that the sealant 12 in the peripheral region Q2 covers at least a part of the areas of the switching transistors in the test units 4 as bezels of the panel become narrower; since the gate electrodes 41 of the three switching transistors in each test unit 4 are an integral structure and made of a metal material, that is, metal structures in big blocks exist in the sealant 12, ultraviolet light (UV light) is blocked by the metal blocks when a side of the array substrate away from the color film substrate is irradiated with the UV light to cure the sealant 12, which causes a problem of poor curing of the sealant 12; and meanwhile, the sealant 12 covers at least a part of the areas of the switching transistors in the test units 4, in which case it is suitable for the liquid crystal panel to adopt the array substrate provided by the embodiments of the present disclosure to achieve narrow bezels.

In order to solve the above technical problems, the following technical solutions are provided in the embodiments of the present disclosure.

It should be noted that the following description of the embodiments is given by taking a case where the display substrate is an array substrate and each pixel unit 1 includes three sub-pixels 11, namely, a red sub-pixel R, a green sub-pixel G and a blue sub-pixel B respectively.

In a first aspect, an embodiment of the present disclosure provides an array substrate, which includes a base substrate and thin film transistors disposed in a peripheral region of the base substrate, and a gate electrode of the thin film transistor includes a plurality of sub-electrodes. The thin film transistors are thin film transistors with relative large sizes in the peripheral region, such as a thin film transistor having an output function in a gate driver circuit and a switching transistor in a test unit.

In the array substrate provided by the embodiment of the present disclosure, the gate electrode of the thin film transistor in the peripheral region includes the plurality of sub-electrodes arranged at intervals. By doing so, when the array substrate and a color film substrate are sealed by the sealant and the sealant covers at least a part of the areas of the switching transistors, no big blocks of a metal material of the gate electrodes exist in a sealant due to the spaced sub-electrodes of the gate electrodes of the thin film transistors. Thus, the problem of poor curing of the sealant by the UV light caused by the existence of the big blocks of the metal material of the gate electrodes may be greatly alleviated.

In the following embodiments, the switching transistor in the test unit in a test area is taken as an example of the thin film transistor.

With reference to FIGS. 1, 4, 5 and 7, the embodiments of the present disclosure provide an array substrate, which includes a base substrate, and at least one test unit 4 disposed in a test area Q22 of the base substrate, and each test unit 4 includes at least one switching transistor, each switching transistor inputs a test signal to a corresponding data line 33 in response to a switch signal, so as to supply the test signal to a sub-pixel 11 coupled to the data line 33. In particular, a gate electrode 41 of at least one switching transistor in each test unit 4 includes sub-electrodes 411 arranged at intervals.

Figure 4:
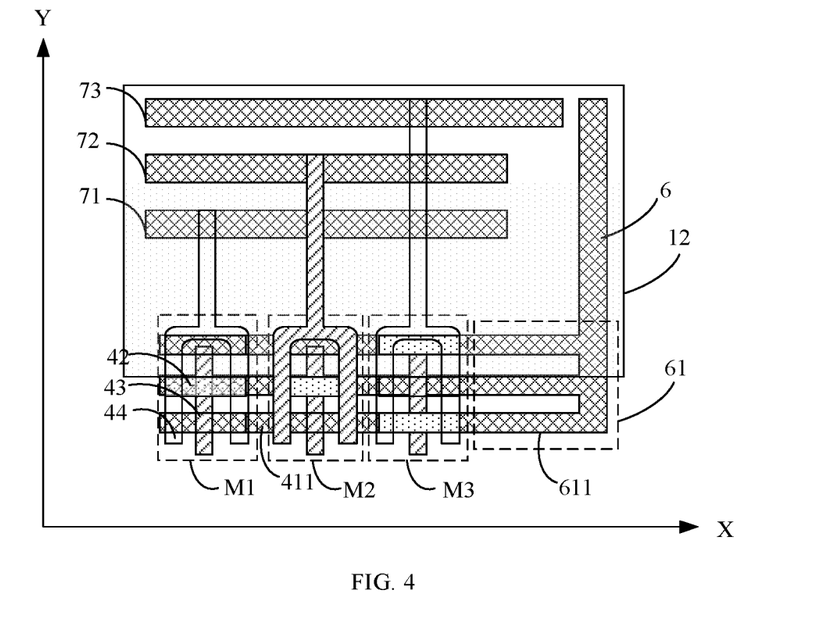
FIG. 4 is a layout diagram of a test area of a display substrate according to an embodiment of the present disclosure.
Figure 5:
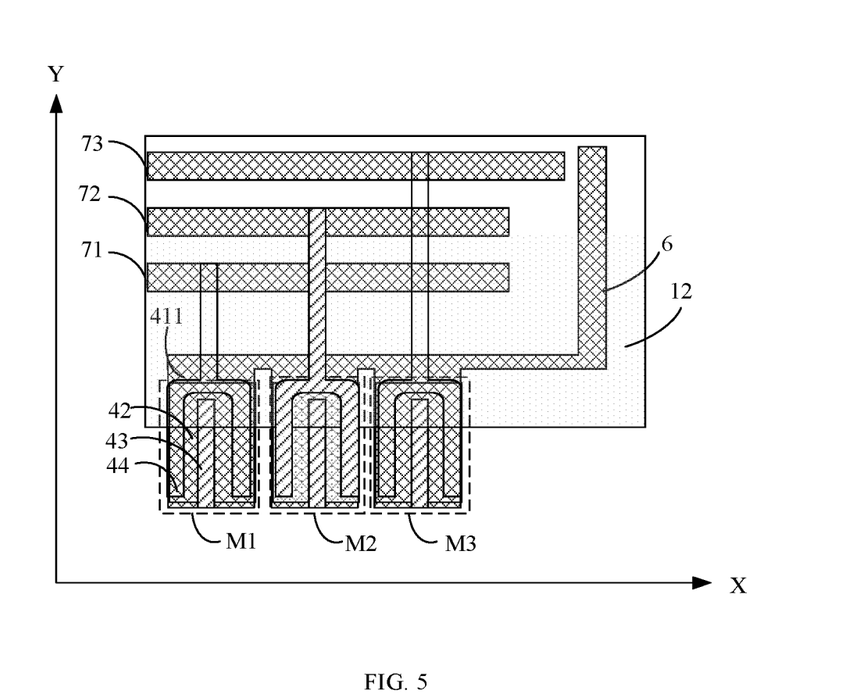
FIG. 5 is another layout diagram of a test area of a display substrate according to an embodiment of the present disclosure.
Figure 7:
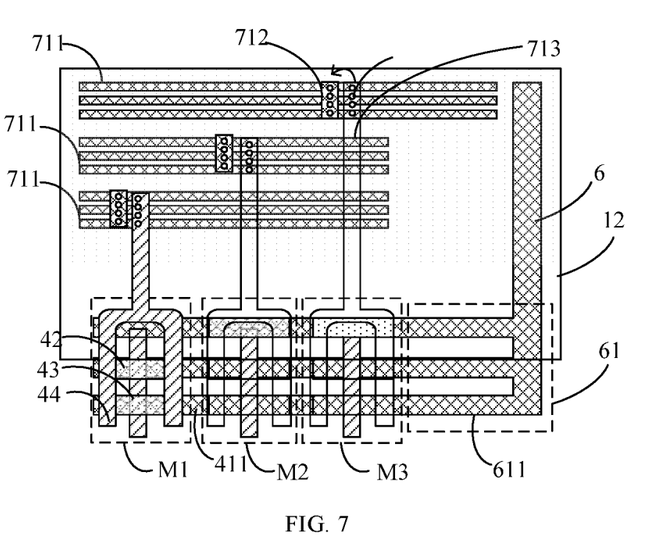
FIG. 7 is still another layout diagram of a test area of a display substrate according to an embodiment of the present disclosure.

In the array substrate provided by the embodiments of the present disclosure, the gate electrode 41 of at least a part of the switching transistors in the test unit 4 includes a plurality of sub-electrodes 411 arranged at intervals, so that no big blocks of a metal material of the gate electrodes exist in a sealant 12 due to the plurality of spaced sub-electrodes of the gate electrodes of the switching transistors when the array substrate and a color film substrate are sealed by the sealant 12 and the sealant 12 covers at least a part of the areas of the switching transistors. Thus, the problem of poor curing of the sealant 12 by the UV light caused by the existence of the big blocks of the metal material of the gate electrodes 41 may be greatly alleviated.

In some embodiments, a middle region Q1 of the array substrate is a display region of the array substrate, and a plurality of pixel units 1 are arranged in an array in the display region; and each pixel unit 1 includes a plurality of sub-pixels 11, for example, each pixel unit 1 includes three sub-pixels 11, which are a red sub-pixel 11, a green sub-pixel 11 and a blue sub-pixel 11 respectively. Each test unit 4 is coupled to a column of pixel units 1, and each switching transistor in the test unit 4 is coupled to a column of sub-pixels 11 in the pixel units 1. In a case where each pixel unit 1 includes a red sub-pixel R, a green sub-pixel G and a blue sub-pixel B, the test unit 4 includes three switching transistors, which are coupled to a column of red sub-pixels 11, a column of green sub-pixels 11 and a column of blue sub-pixels 11, respectively. Since the switching transistors in each test unit 4 are coupled to different columns of sub-pixels 11 in one pixel unit 1, the gate electrodes 41 of the switching transistors in each test unit 4 may be shared.

It should be understood that, since the gate electrodes 41 of the switching transistors in each test unit 4 are shared, that is, the gate electrodes 41 of the switching transistors in each test unit 4 are an integral structure, an orthographic projection of the gate electrode 41 on the base substrate should at least partially overlap with an orthographic projection of a semiconductor active layer 42 of the switching transistor in the test unit 4 on the base substrate, so as to ensure switching characteristics of each switching transistor. Of course, an orthographic projection of each sub-electrode 411 of the gate electrode 41 on the base substrate also at least partially overlaps with the orthographic projection of the semiconductor active layer 42 of the switching transistor in the test unit 4 on the base substrate. In some embodiments, the orthographic projection of the semiconductor active layer 42 of each switching transistor in each test unit 4 on the base substrate is located within the orthographic projection of the sub-electrodes 411 on the base substrate, which may avoid an influence of irradiation of external ambient light on switching characteristics of the semiconductor active layer 42.

Since the gate electrodes 41 of the switching transistors in each test unit 4 are shared, the switch signals may be input to the gate electrodes 41 through one switch signal line 6, which can reduce the wires in the peripheral region Q2 of the array substrate and thus facilitate the narrow bezel of the display panel adopting the array substrate provided by the embodiments of the present disclosure. Meanwhile, with each test unit 4 controlled by one switch signal, detection timing of the array substrate can be simpler and can be easily realized.

In some embodiments, intervals between adjacent sub-electrodes 411 of each switching transistor in each test unit 4 are equal to one another. Values of the specific intervals may be set according to a width and a thickness of the sealant 12. The interval between two adjacent sub-electrodes 411 refers to a distance between the two adjacent sub-electrodes 411 along a direction perpendicular to an extending direction of the sub-electrodes 411.

In some embodiments, widths of the sub-electrodes of the gate electrode of the switching transistor in each test unit are equal to one another. In some embodiments, a ratio of the distance between two adjacent sub-electrodes 411 to the width of the sub-electrode 411 is greater than 1:5; in some embodiments, the ratio of the distance between two adjacent sub-electrodes 411 to the width of the sub-electrode 411 is 1:5 to 3:10. The width of the sub-electrode 411 may be about 10 μm to 90 μm, and the distance between two adjacent sub-electrodes 411 may be about 2 μm to 18 μm. The embodiments of the present disclosure are not limited to the above width of each sub-electrode 411, and the width of the sub-electrode 411 and the distance between two adjacent sub-electrodes 411 may be specifically set according to the width and the thickness of the sealant 12.

In some embodiments, the array substrate includes a plurality of gate lines 2 and a plurality of data lines 3, which are all disposed on the base substrate, and the sub-pixels 11 in a same row are coupled to a same gate line 2, and the sub-pixels 11 in a same column are coupled to a same data line 3. Specifically, each sub-pixel 11 at least includes one display transistor and a pixel electrode, and a gate electrode 41 of the display transistor is coupled to the gate line 2, a source electrode 43 is coupled to the data line 3 and a drain electrode 44 is coupled to the pixel electrode. When an operating level is written to the gate line 2, the display transistor is turned on and a data voltage written to the data line 3 is written to the pixel electrode through the display transistor, and, at this time, an electric field produced by the pixel electrodes and a common electrode (which may be disposed on the array substrate or the color filter substrate) drives liquid crystal molecules in the liquid crystal panel to deflect, so as to enable the sub-pixel 11 to display. In the embodiments of the present disclosure, the source electrode 43 of the switching transistor of the test unit 4 is coupled to the sub-pixel 11 through the data line 3, that is, when an operating level is written to the gate electrode 41 of the switching transistor, the test signal written to the drain electrode 44 of the switching transistor is written to the sub-pixel 11 through the data line 3; meanwhile, the display transistor in the sub-pixel 11 is also in an operating state, so that the test signal written to the data line 3 is written to the pixel electrode, so as to test the sub-pixel 11 by testing a display effect of the sub-pixel 11.

In some embodiments, the array substrate further includes switch signal lines 6 disposed in one-to-one correspondence with the test units 4, each switch signal line 6 is provided with a main body, and a first connection end 61 and a second connection end, which are coupled to two ends of the main body respectively; and the first connection end 61 of the switch signal line 6 is coupled to the gate electrode 41 of the switching transistor of the corresponding test unit 4, and the second connection end is coupled to the control pad 9 located in the fan-out area Q21. It should be noted that the switch signal lines 6 are arranged in the peripheral region Q2 of the base substrate for avoiding the influence of the switch signal lines 6 on the aperture ratio of the pixel.

In an example, when the gate electrodes 41 of the switching transistors in each test unit 4 are shared, for each test unit 4, a switch signal line 6 is coupled to the test unit, an extending direction of the first connection end 61 of the switch signal line 6 is the same as that of each sub-electrode 411 in the test unit 4, and the first connection end 61 is coupled to each sub-electrode 411. Specifically, the first connection end 61 has a comb-shaped structure, that is, the first connection end 61 includes a plurality of teeth 611, and an extending direction of the teeth 611 is the extending direction of the first connection end 61. As shown in FIG. 4, the extending direction of the teeth 611 and that of the sub-electrode 411 are both the X direction. The teeth 611 of the first connection end 61 of the switch signal line 6 are arranged in one-to-one correspondence with the sub-electrodes 411, and each tooth 611 and the sub-electrode 411 coupled thereto are made into an integral structure. That is to say, the teeth 611 of the first connection end 61 and the sub-electrodes 411 of the gate electrode 41 are disposed on the same layer and made of a same material, so that the switch signal line 6 and the gate electrode 41 of the switching transistor may be formed through one patterning process, which not only saves a process cost but also makes the array substrate thin. Meanwhile, as shown in FIG. 4, the first connection end 61 of the switch signal line 6 is coupled with the main body of the switch signal line 6 to form an L-shaped structure. By setting the first connection end 61 of the switch signal line 6 into the comb-shaped structure, the corner of the L-shaped structure may be prevented from constituting a big metal block due to a large size, thereby effectively avoiding the problem of poor curing of the sealant 12 due to the big metal blocks.

In another example, as shown in FIG. 5, when the gate electrodes 41 of the switching transistors in each test unit 4 are shared, for each test unit 4, a switch signal line 6 is coupled to the test unit, the extending direction of the first connection end 61 of the switch signal line 6 intersects with the extending direction of each sub-electrode 411 in the test unit 4, and the first connection end 61 is coupled to each sub-electrode 411. Specifically, for example, the extending direction of the first connection end 61 of the switch signal line 6 is perpendicular to the extending direction of each sub-electrode 411. As shown in FIG. 5, the extending direction of the first connection end 61 of the switch signal line 6 is the X direction, while the extending direction of each sub-electrode 411 is the Y direction. The first connection end of the switch signal line 6 extends to one end of each sub-electrode 411 and is coupled to each sub-electrode 411. The first connection end of the switch signal line 6 and each sub-electrode 411 may be made into an integral structure, so that the switch signal line 6 and the gate electrode 41 of the switching transistor may be formed through one patterning process, which not only saves the process cost but also makes the array substrate thin.

As shown in FIG. 5, when the extending direction of the first connection end 61 of the switch signal line 6 intersects with the extending direction of each sub-electrode 411 in the test unit 4, the sub-electrodes 411 in the test unit 4 may be disposed in one-to-one correspondence with the switching transistors in the test unit 4, which may facilitate preparation of the semiconductor active layer 42 of the switching transistor.

In some embodiments, the array substrate further includes test signal lines 7 disposed on the base substrate, and the test signal lines 7 are arranged in one-to-one correspondence with the switching transistors and are coupled to the drain electrodes 44 of the switching transistors for writing test signals to the drain electrodes 44 of the switching transistors. It should be noted that, in order to avoid an influence of the test signal lines 7 on the aperture ratio of the pixel of the array substrate, the test signal lines 7 may be disposed in the peripheral region Q2 of the array substrate, with one end of the test signal line 7 coupled to the drain electrode 44 of the corresponding switching transistor and the other end of the test signal line 7 coupled to the test pad 10 located in the fan-out area Q21.

Specifically, as shown in FIGS. 4, 5 and 7, each test unit 4 includes three switching transistors, which are denoted by M1, M2 and M3 respectively; and the switching transistors are arranged in one-to-one correspondence with the data lines. The source electrode of M1 is coupled to the data line 31, the source electrode of M2 is coupled to the data line 32, the source electrode of M3 is coupled to data line 33, the drain electrode of M1 is coupled to the test signal line 71, the drain electrode of M2 is coupled to the test signal line 72, the drain electrode of M3 is coupled to the test signal line 73, and a common gate electrode 41 of the switching transistors is coupled to the switch signal line 6. When an operating level is written to the switch signal line 6, the switching transistor is turned on, and the test signal line 7 writes a test signal to the corresponding data line 3 through the switching transistor, so as to test the sub-pixel 11 coupled to the data line 3.

Figure 6:
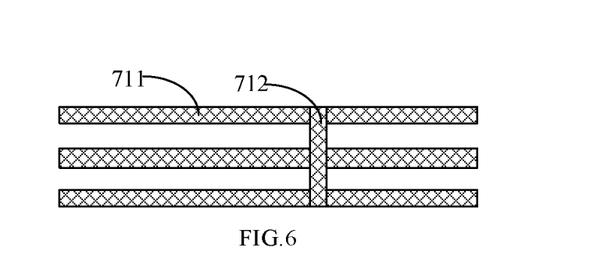
FIG. 6 is a schematic diagram of a test signal line in a display substrate according to an embodiment of the present disclosure.

In some embodiments, as shown in FIG. 6, each test signal line 7 includes a plurality of sub-signal lines 711 arranged at intervals, and a connection portion 712 connecting the sub-signal lines. The connection portion 712 of each test signal line 7 is coupled to the drain electrode 44 of the switching transistor corresponding to the test signal line 7. The reason for such configuration is that, considering the test signal lines 7 disposed in the peripheral region Q2 are usually covered by the sealant 12 as the bezels of the display panel become narrower, designing the test signal line 7 in the structure composed of a plurality of spaced sub-signal lines 711 may prevent the arrangement of the test signal lines from causing the problem of poor curing of the sealant 12.

In some embodiments, as shown in FIG. 7, in a case where each test signal line 7 includes the plurality of sub-signal lines 711 arranged at intervals, and the connection portions 712 connecting the sub-signal lines, test connection lines 713 are disposed in one-to-one correspondence with the test signal lines 7 on the base substrate, and the connection portion 712 of each test signal line 7 is coupled to the drain electrode 44 of the switching transistor through the test connection line 713. An interlayer insulating layer is disposed between a layer where the connection portion 712 is located and a layer where the test connection line 713 is located, and the test connection line 713 is coupled to the connection portion 712 through a via penetrating the interlayer insulating layer. In order to ensure stability of the connection between the test connection line 713 and the connection portion 712, a plurality of vias may be provided in the interlayer insulating layer to allow for good connection between the connection portion 712 and the test connection line 713. As shown in FIG. 7, the plurality of vias may be arranged in a column along an extending direction of the test connection line 713, but the arrangement of the vias is not limited thereto, and may be specifically set according to a size of the connection portion 712.

In some embodiments, when the connection portion 712 of each test signal line 7 is coupled to the drain electrode 44 of the switching transistor through the test connection line 713, the sub-signal lines 711 and the connection portion 712 of the test signal line 7 may be disposed on the same layer as the switching transistor and made of a same material, and the test connection line 713 may be disposed on the same layer as the source electrode 43 and the drain electrode 44 of the switching transistor and made of a same material, so that formation of the switching transistor and formation of the test signal line 7 and the test connection line 713 may be achieved at the same time, which avoids increasing process steps.

In some embodiments, the sealant 12 is further disposed in the peripheral region Q2 of the base substrate, and covers at least a part of the areas of the gate electrodes 41 of the switching transistors. The sealant 12 may also cover the test signal lines 7, the test connection lines 713 and the switch signal lines 6 to narrow the bezels of the array substrate.

It should be noted that each switching transistor in the test units 4 in the embodiments of the present disclosure may be a bottom-gate thin film transistor or a top-gate thin film transistor. The gate electrode 41 of the bottom-gate thin film transistor is closer to the base substrate than the semiconductor active layer 42 of the bottom-gate thin film transistor; and the semiconductor active layer 42 of the top-gate thin film transistor is closer to the base substrate than the gate electrode 41 of the top-gate thin film transistor. In some embodiments, the switching transistors in the embodiments of the present disclosure are bottom-gate thin film transistors, so as to prevent the switch characteristics of the switching transistors from being affected by irradiation of the semiconductor active layers 42 of the switching transistors by the UV light when the sealant 12 is irradiated with the UV light to cure.

In a second aspect, an embodiment of the present disclosure provides a display device, which may include the display substrate described above, and a counter substrate disposed opposite to the display substrate. Since the display device provided by the embodiment of the present disclosure includes the display substrate described above, the sealant 12 in the display device has a good sealing effect.

The display device may be an electronic device having a display panel, such as a mobile phone, a tablet computer, an electronic watch, a sports bracelet and a notebook computer.

It should be understood that the above embodiments are merely exemplary embodiments adopted to illustrate the principle of the present disclosure, and the present disclosure is not limited thereto. Various modifications and improvements can be made by those of ordinary sill in the art without departing from the spirit and essence of the present disclosure, and those modifications and improvements are also considered to fall within the scope of the present disclosure.

What is claimed is:

1. A display substrate, comprising:
    a base substrate having a peripheral region; and
    at least one test unit in the peripheral region of the base substrate, each of the at least one test unit comprising a plurality of thin film transistors,
    wherein the plurality of thin film transistors share a gate electrode, and the shared gate electrode comprises a plurality of sub-electrodes arranged at intervals and each extending in a first direction,
    the display substrate further comprises a switch signal line coupled to the test unit, and a different test unit is coupled to a different switch signal line, and
    the switch signal line has a main body extending in a second direction that intersects the first direction and a plurality of tooth each extending in the first direction from the main body, the plurality of tooth are coupled to the sub-electrodes in one-to-one correspondence, and each tooth and the sub-electrode coupled thereto are an integral structure.

2. The display substrate of claim 1, wherein the peripheral region comprises a test area, the at least one test unit in the test area of the base substrate, and the thin film transistors are switching transistors wherein.

3. The display substrate of claim 2, wherein the base substrate further has a display region, a plurality of pixel units are arranged in an array in the display region, and each of the plurality of pixel units comprises a plurality of sub-pixels, the at least one test unit is coupled to a column of the pixel units, each switching transistor of each test unit is coupled to a column of the sub-pixels, and
    a gate electrode of the at least one switching transistor of each test unit are an integral structure.

4. The display substrate of claim 3, further comprising a plurality of data lines on the base substrate, wherein the sub-pixels in the same column are coupled to the same data line, and a source electrode of the switching transistor is coupled to the sub-pixels through the data line.

5. The display substrate of claim 1, wherein intervals between the sub-electrodes of the gate electrode are equal to one another, and/or a width of each sub-electrode of the gate is equal.

6. The display substrate of claim 1, wherein a ratio of an interval between two adjacent sub-electrodes to a width of the sub-electrode is greater than 1:5.

7. A display panel, comprising the display substrate of claim 1, and a counter substrate opposite to the display substrate.

8. A display panel, comprising the display substrate of claim 2, and a counter substrate opposite to the display substrate.

9. A display panel, comprising the display substrate of claim 3, and a counter substrate opposite to the display substrate.

10. A display panel, comprising the display substrate of claim 4, and a counter substrate opposite to the display substrate.

11. A display panel, comprising the display substrate of claim 5 and a counter substrate opposite to the display substrate.

* * * * *